Shirk & Martin.
Boiler Feeder.

N° 89,087. Patented Apr. 20, 1869.

Witnesses:
Wm B. Wiley
Jacob Stauffer

Inventor,
Joseph Shirk
Isaac W. Martin

JOSEPH SHIRK AND ISAAC W. MARTIN, OF EAST EARL TOWNSHIP, PENNSYLVANIA.

*Letters Patent No. 89,087, dated April 20, 1869.*

IMPROVED BOILER-FEEDER.

The Schedule referred to in these Letters Patent and making part of the same.

*To all whom it may concern:*

Be it known that we, JOSEPH SHIRK and ISAAC W. MARTIN, of East Earl township, in the county of Lancaster, and State of Pennsylvania, have invented a new and improved Mode of Applying a Self-Feeding Apparatus to Supply Water to Steam-Boilers; and we do hereby declare that the following is a full and exact description thereof, reference being had to the accompanying drawings, making a part of this specification, in which—

Figure 3:

Figure 3, one of the stuffing-box plates.

Figure 4:
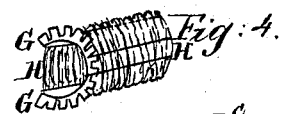

Figure 4, a pair of these plates, with the stuffing around them.

Figure 1:
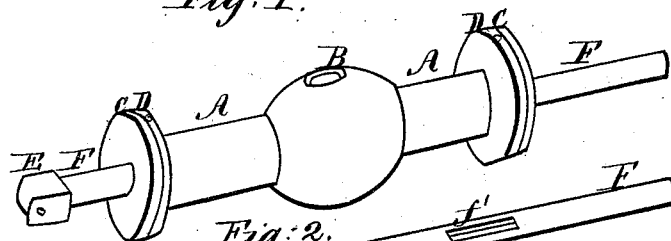
Figure 1 is a perspective view of our horizontal pump and slotted piston.
Figure 5:
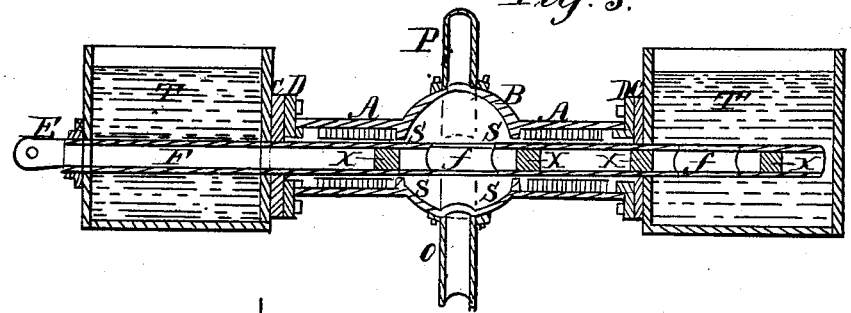

Figure 5, a section of fig. 1, with the water-tanks attached at each end.

Figure 6:
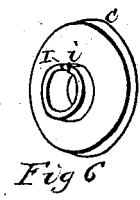

Figure 6, the outer flange, to show the slotted collar.

Figure 7:
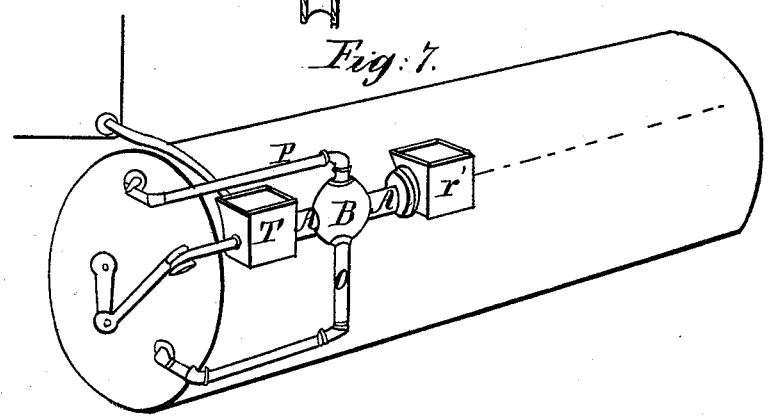

Figure 7, the apparatus connected to a steam-boiler.

The nature of our invention consists in the construction and arrangement of peculiarly-formed stuffing-plates with a single piston-rod, of uniform thickness throughout, and provided with a tubular recess, or recesses, perforated vertically with an oblong slot, open above and beneath, operated horizontally within a continuous cylinder, centrally enlarged or not.

This cylinder may be attached at one or both ends to a water-tank, into which the piston is alternately drawn and pushed out by means of ordinary crank-gearing, or connection, in such a manner as to receive the water in the tubulated slot, and discharge it into a pipe connected with the boiler and cylinder, affixed to the outside of steam-boilers, at such a point as to keep the water within the boiler constantly at a given height, or water-level.

To enable others skilled in the art to make and use our invention, we will more fully explain its construction and operation.

Fig. 1 gives a clear view of the cylinder A A, for two tanks, with a central enlargement, B, open at top and bottom, for the attachment of pipes, O P, figs. 5 and 7.

The united length may be, say, eighteen inches long, with a flange, D, on each end, having a perforation to the interior, through which the steam may be discharged, that may be brought out by the open slot, and otherwise be discharged in the water-tank T.

The outer flange C, fig. 6, has a collar, I, which fits into the open end of the cylinder and flange A D.

This collar is provided with a slot, $i$, directly under the aforesaid perforation in the flange D, so as to interpose no barrier to the escape of the steam referred to above.

Figure 2:
Figure 2 shows the tubular piston and two slots.

This cylinder has a shoulder, $s$, on each side of the central enlargement, to admit stuffing, made by means of curved plates, G, fig. 3, turned up at one end, the curve adapted to the rounding of the piston F, fig. 2.

One of these plates G comes on top of the piston, the other beneath it. The turned-up ends rest against the shoulders, within the cylinder, and both have the ordinary stuffing-material wound around them, as shown by fig. 4.

These metallic plates fit closely over the slotted piston, and keep the stuffing from being disturbed, or chafed by the friction of the slots in the rod.

This rod, or piston F, fig. 2, is made out of gas, or steam-pipe, having one and a-half inch bore, (or thicker, if need be, or less, according to the size of boiler to be supplied.)

This pipe we shut off at the desired points by plugs, X, fig. 5, and form a tubular cell, through the centre of which we cut a vertical slot, $f$, of the required size, (say, three inches long and one-half inch wide,) at such points, that when the one slot is in the centre, over the discharge-pipe O, the other slot is in the water-tank T', as shown in fig. 5, alternating, as the piston is drawn back and forth, by means of a connecting-rod and crank-motion attached to the one end at E, by any of the ordinary contrivances.

The outer flanges C, being bolted to the tanks T T', filled with water from a cistern, or otherwise. These tanks are no wider than the length of stroke, say, ten inches, the piston just passing through the outer wall of the one with the proper stuffing.

The operation is such, that when this device is affixed at any point most convenient to the outside of a boiler, at such a height that the centre of the cylinder, or point of discharge from the piston, is on the same plane as the desired water-level within the boiler, it is evident that the open tubular recess will fill with water and carry it to the centre, where the water will discharge itself into the pipe O, or so much of it as will be required to bring it to the level. The remainder may be carried to and fro, as the slotted piston alternately enters the one tank or the other, continually supplying the waste, and keeping the water permanently at one uniform height within the boiler, the water also becoming heated to the boiling-point. By the upper pipe, P, also opening into the boiler above the water-level, no back action can take place, and a regular pressure and supply of water are secured; and no neglect on the part of the engineer, nor stoppage of valves, need be apprehended. It is verily believed to be a protection against boiler-explosions.

We are aware that Patent No. 20,477, June 8, 1858, is for the same object, but differs substantially in the construction. The arrangement and combination therein claimed consist of three cylinders and four pistons, with two cisterns. The piston-rods are not uniform in size, having the packing attached, nor are they perforated, or tubular-celled, nor central-pipe connection to an enlarged portion.

Besides, Patent No. 14,576, April 1, 1856, shows a pump for a similar purpose. But this combines an adjustable sliding block, movable on the lever-arm, neither of which we use or claim. Nor do we claim the tanks, apart from our arrangement, as a whole. The crank and connection are common.

We may add, that for a small boiler, a single tank, and a single slot in the piston, will suffice. Otherwise, the arrangement is all the same.

What we claim as our invention, and desire to secure by Letters Patent, is—

The flanged stuffing-plates G, in combination with the plunger, or piston F, cylinder A B, and shoulders s, constructed and arranged as described.

JOSEPH SHIRK.
ISAAC W. MARTIN.

Witnesses:
  WM. B. WILEY,
  JACOB STAUFFER.